E. SCHILDHAUER.
TOWING SYSTEM FOR CANALS.
APPLICATION FILED NOV. 28, 1910.
1,013,901.
Patented Jan. 9, 1912.
2 SHEETS—SHEET 2.
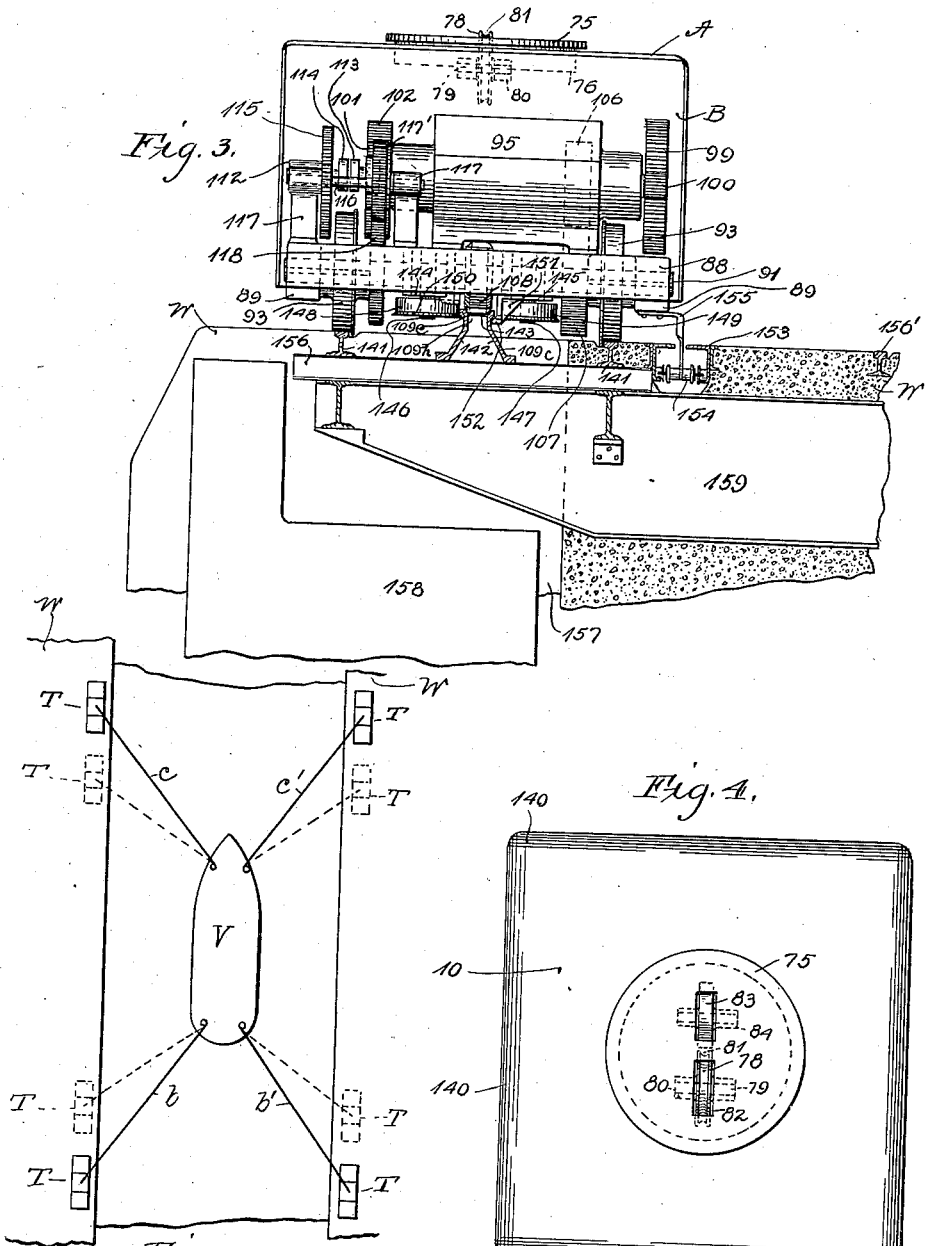

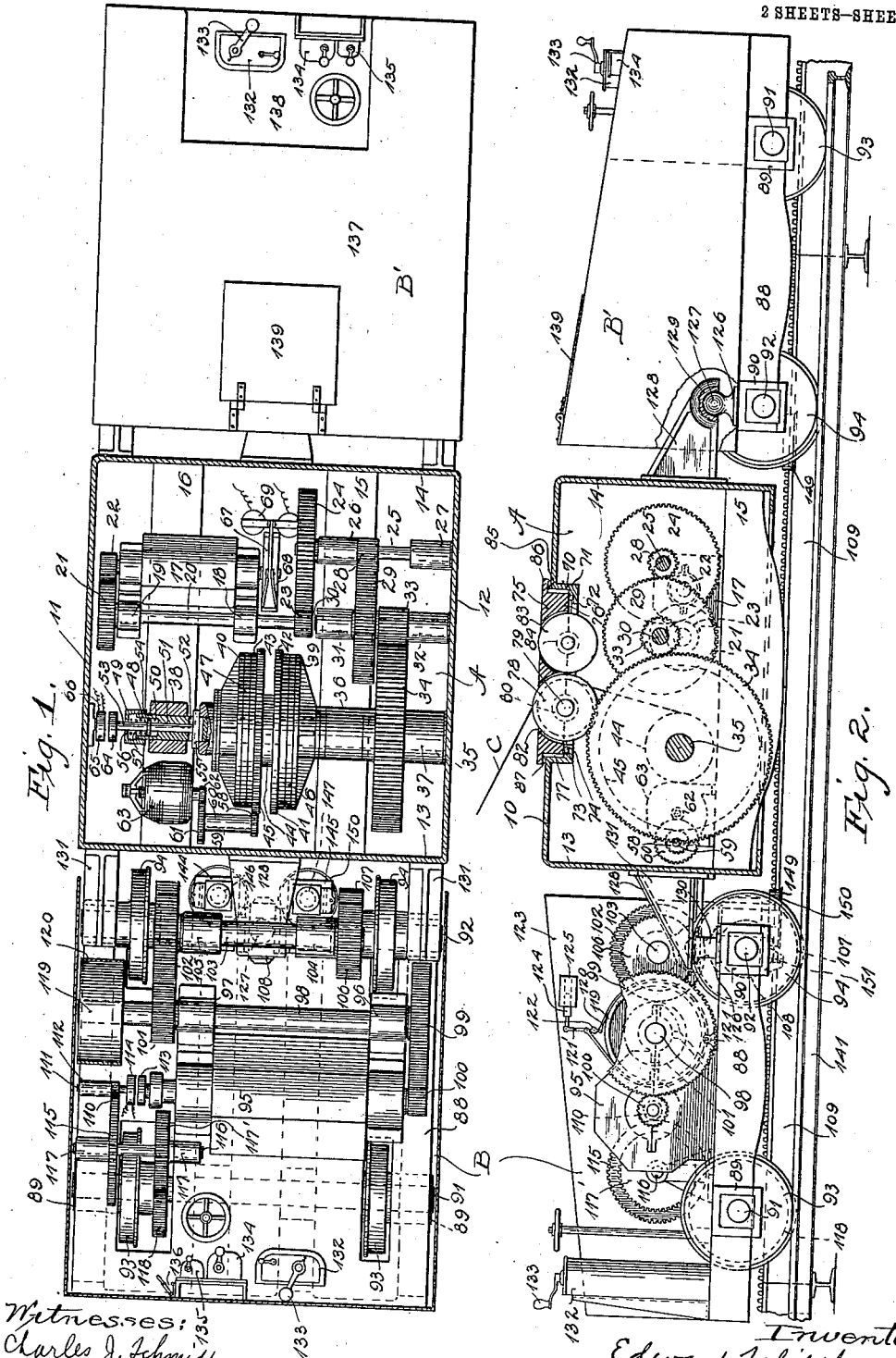

UNITED STATES PATENT OFFICE.

EDWARD SCHILDHAUER, OF CULEBRA, CANAL ZONE.

TOWING SYSTEM FOR CANALS.

1,013,901.   Specification of Letters Patent.   Patented Jan. 9, 1912.

Application filed November 28, 1910. Serial No. 594,500.

*To all whom it may concern:*

Be it known that I, EDWARD SCHILDHAUER, residing at Culebra, Canal Zone, Panama, have invented certain new and useful Improvements in Towing Systems for Canals, of which the following is a full, clear, and precise specification.

My invention relates to towing systems for large canals, particularly to systems for controlling the towing of larger sized vessels through canal locks and for controlling the maneuvering of such vessels in the locks, and my invention involves first, an improved method of procedure for towing or controlling vessels in canal locks, and second, improved apparatus for carrying out such process or procedure.

Various methods have been used and are being used for towing vessels through canals. In some of these earlier methods a chain is laid in the canal and the vessel provided with a sprocket wheel adapted to be driven into engagement with the chain to thus propel the vessel. In other systems capstans were used in various ways and combinations for maneuvering the vessels. Again, in other systems traction or trolley devices were run on cables and connected with the vessel to be controlled. Other systems were also used and tried. However, in all of these prior systems the control of the boat depended to a great extent on its own steering apparatus, and experience seems to indicate that misunderstanding of signals between the officers and engineers of the vessels was the main cause for loss of control of the vessel and injury thereto and to the canal walls. Furthermore, modern vessels are inclined to be of greater tonnage and therefore require stronger and more efficient and reliable towing controlling mechanism, the greatest force to be overcome by the towing apparatus being the inertia of the vessels.

One of the main objects of my invention is, therefore, to provide a system of towing in which vessels of great weight can be controlled entirely independently of their own steering and controlling mechanism. To this end my procedure is to provide powerful and heavy tractor engines to run along the canal walls, two running opposite each other in advance of the vessel, and two running opposite each other to follow the vessel. Cables run from the forward tractor engines and connect with the port and starboard sides respectively of the vessel at the prow thereof, and cables connect the rear tractor engines with the port and starboard sides respectively of the stern of the vessel. The length of the various cables is adjusted to primarily position the vessel in mid-channel, whereafter the advance engines are started to pull the vessel, and the two rear engines will trail and are pulled by the vessel, so that the cables are always taut. The cables extending from the rear engines will be controlled from the engines to be lengthened or shortened, to thus steer and guide the vessel as it is being towed by the advance engines. When the vessel is to be slowed up the speed and pull of the front engines is reduced and the rear engines are braked, and to stop the vessel all the engines are brought to rest. The operators of the engines will have unobstructed view of each other and of the vessel to be controlled, and there can be no misunderstanding of signals by persons who can not see the vessel and must be controlled solely by audible signals. Thus the vessel is at all times completely under control entirely independently of its own power and controlling mechanism, and injury to the vessel and to the canal walls and gates is therefore eliminated.

As to the traction engines, the main objects of the invention are to construct such engines to be of sufficient capacity for controlling very large vessels and to have the center of gravity comparatively low, so that danger of upsetting will be reduced to a minimum; to so construct such engines that they will readily take the track, curves and the steep and abrupt inclines between locks; to provide improved traction mechanism for preventing any slip of the engines when towing a vessel; to provide interchangeable driving mechanisms, one for propelling an engine slowly and powerfully when towing, and the other to drive the engine at a faster speed when out of towing connection and returning for another towing connection; to provide yielding mechanism for connecting the tow line with the engine, which mechanism can be adjusted and set for a certain maximum tension, below which maximum the tow line will be rigidly connected to the engine and will not slip, and above which maximum the tow line will give to be thereby prevented from parting, the maximum being, however, set sufficiently high so that control of the vessel will never be lost; to provide interchangeable mechanisms for controlling the tow line, one of which mechanisms when connected being adapted to slowly let out or take in the cable during maneuvering and control of a vessel, and the other apparatus when connected serving to quickly haul in the cable when disconnected from the vessel; to provide means for more or less automatically effecting the connection for service of the various interchangeable controlling mechanisms; to provide improved guide mechanism for the cable of an engine where it leaves the engine, such mechanism being designed to reduce friction to a minimum and to at all times guide the cable accurately from and to the drum mechanism supporting the cable on the engine; and in general to provide an improved and efficient construction of tractor engines for towing purposes.

Among other important objects of my invention are to provide improved arrangement of the towing tractor engines with relation to the canal walls, so that the towing cables can adjust themselves readily to the varying heights of the connecting points on the vessel with reference to the canal walls, so that the cables will at all times be held clear of the canal walls and chafing of the cables thereby prevented; to adjust the trackage for the tractor engines so that it can be installed close to the edges of the canal walls without extending above the level of the walls to interfere with access to the canal and in order not to interfere with the lock gates where such gates rest in recesses in the sides of the canal walls when in open position.

The various features of my invention will be clearly understood from the following specification and from the accompanying drawing, in which drawings—

Figure 1 is a plan view of the tractor unit from which the top cover parts have been removed at places to more clearly reveal the interior apparatus, Fig. 2 is a side elevational view of the tractor unit, with parts of the side walls removed to more clearly reveal the interior apparatus, Fig. 3 is an end view of the unit with the end wall removed, Fig. 4 is a top view of the central section of a unit to show particularly the cable guiding mechanism, and Fig. 5 is a diagrammatic plan view of a section of a canal to illustrate my improved method of towing.

Each tractor unit comprises a central section A and two smaller end sections B, B'. The central section contains the apparatus for directly controlling the adjustment of the towing cable. This section comprises a substantially rectangular metallic housing frame having a top wall 10, side walls 11 and 12, and end walls 13 and 14, suitable beams 15 and 16 extending between the walls for supporting the various appliances.

On beam 16 is supported a large electric motor 17, whose frame has bearing extensions 18 and 19 journaling in counter shaft 20 mounting at its outer end a gear 21 which meshes with the pinion 22 on the armature shaft of the motor, the inner end of the counter shaft supporting a pinion 23, which meshes with a gear 24 on the inner end of a shaft 25 journaled in bearings 26 and 27 supported respectively on beam 15 and from the side wall 12. Between these bearings the shaft 25 carries a pinion 28 which meshes with a gear 29 supported on shaft 30 between the bearings 31 and 32 supported respectively from beam 15 and from side wall 12. Shaft 30 also carries a pinion 33 which meshes with a gear 34 mounted on shaft 35 journaled at one end in bearings 36 and 37 supported respectively from beam 15 and side wall 12 and journaling at its other end in a bearing 38 supported from beam 16. Keyed to the shaft 35 between the bearings 36 and 38 are the two opposite driving heads 39 and 40, the head 40, however, having longitudinal movement on the shaft toward and away from the head 39. Rotatably mounted on the shaft 35 between the heads is a drum frame 41 comprising side disks 42 and 43, the hub or drum 44 and the gear 45 being secured to the disk 43. Between the inner face of the head 39 and the disk 42 is a friction or slip disk 46, and between the inner face of head 40 and the disk 43 is a friction or slip disk 47. For controlling the frictional engagement between the heads 39 and 40 and the drum frame 41 adjustable spring mechanism is provided. The end section 48 of the shaft at the bearing 38 is threaded to receive a threaded cap 49. This end of the shaft has also a pocket 50 in its end, from which extends the axial passageway 51 which terminates in the diametral slot or keyway 52. Through the passageway 51 extends the slide rod 53 carrying a collar 54 adapted to slide in the pocket 50, the inner end of the rod abutting against a key 55 extending transversely through the slot 52, the slot 52 being wider in axial direction than the width of the key. Surrounding the rod 53 between its collar 54 and the inwardly extending flange 56 at the end of cap 49 is a compression spring 57. With this arrangement, turning of the cap 49 on the shaft end will adjust the spring to vary the pressure against the collar 54 and thereby the pressure of the rod 51 against the key 55, the pressure of this key being transmitted to the head 40 slidable on shaft 35, and thereby the pressure of the friction disks 46 and 47 against the heads 39 and 40 will be adjustable.

The gear 45 on the drum frame 41 meshes with a pinion 58 mounted on a shaft 59 journaled in a bearing 60, the other end of this shaft carrying a gear 61, which meshes with the pinion 62 on the armature shaft of a small driving motor 63 mounted on the beam 16. Suitable means should be provided for releasing the motor 17 from driving connection with the drum 41, so that this drum can be driven by motor 63. I prefer to use electrical means in the form of a magnetic clutch release mechanism, this mechanism, as shown, comprising one clutch half 64 carried at the outer end of the rod 53, and the other clutch half 65 supported from the side wall 11, this half 65 containing the magnetizing winding 66 through which current flow may be controlled, as will be described later. Normally the circuit is broken, so that the spring 57 may effect frictional clutching engagement between the drum frame 31 and the heads 39 and 40, as these heads are directly driven upon operation of the motor 17, and if desired to control the rotation of the drum frame 41 by the motor 63 the circuit is closed to magnetize the magnetic clutch, whereupon the half 64 forming the armature of the clutch mechanism will be drawn outwardly against the compression force of spring 57 to thus release the key 55 from pressure engagement with the head 40 to thereby release the drum 41 from driving connection with the heads 39 and 40 and the motor 17. Then by controlling the current supply to motor 63 the drum 41 will be driven thereby. The gearing train between the motor 17 and heads 39 and 40 will cause very slow speed of the cable drum frame for slowly and powerfully controlling the cable, while the gearing train between the motor 63 and the cable drum frame will cause the drum frame to be driven at much greater speed, the motor 63 being operated to control the cable drum when the cable is to be hauled in upon disconnection from the vessel after towing thereof. In practice the maximum speed of the cable during towing will be something like 10 feet per minute, while its speed when being hauled in will be something like 200 feet per minute. For instantaneously braking the driving train controlled by motor 17 the armature shaft of the motor may be provided with a brake wheel 67 engaged by a brake strap 68, whose engagement with the wheel is desirably controllable by magnetic mechanism 69, whose circuit connections will be described more in detail later.

In Figs. 2, 3 and 4 the construction of the guide mechanism is shown for guiding the cable as it leaves the drum frame. The top wall 10 has the circular opening 70 therethrough, which has the peripheral downward extension 71 terminating in the horizontal inwardly extending flange 72, this flange having the annular pocket 73 in its top forming a receptacle for receiving the bearing balls 74. A turret frame 75 has the annular flange 76 which engages the balls 74. Between the outer face of the flange 76 and the inner face of the extension 71 bearing cylinders or rollers 77 are inserted, the balls 74 and the rollers 77 reducing to a minimum the rotational friction of the turret frame. A sheave 78 is mounted on shaft 79 trunnioned at its ends in bearing extensions 80 forming part of or secured to the turret frame, and the peripheral groove 81 of this sheave is, at the inner side of the sheave, concentric with the center of the circular turret frame and vertically over the receiving drum or hub section 44 of the drum frame 41, so that the turret frame may rotate through 360 degrees without disturbing the true and accurate alinement of the cable section between the sheave 78 and the drum section 44. The sheave 78 projects a distance beyond the top of the turret frame through the opening 82 in said frame for accommodating the cable C, and to prevent escape of the cable frame sheave an auxiliary sheave 83 is journaled adjacent to and in line with the sheave 78 in suitable bearings 84 secured to or forming part of the turret frame. The upper peripheral edge of the opening 70 has a bead 85, and the turret frame has the flange 86 overhanging the friction rollers 77, the lower peripheral edge of this flange having a bead 87 coöperating with the bead 85 to prevent entrance of water or dirt into the pockets containing the friction rollers and balls.

The end members B and B' are in the form of motor cars for propelling the tractor, each car comprising a suitable truck frame 88 carrying front and rear bearings 89 and 90 for journaling the front and rear axles 91 and 92 supporting the wheels 93 and 94 respectively. Mounted centrally of the car on the truck frame is an electric motor 95 from whose frame extend bearings 96 and 97 journaling the counter shaft 98 whose outer end carries a gear 99 meshing with the motor pinion 100. The inner end of the shaft 98 carries a pinion 101, which meshes with a gear 102 mounted on shaft 103 journaled in bearings 104 and 105 supported from the truck frame, the other end of the shaft 103 carrying a pinion 106, which meshes with a gear 107 secured to the axle 92, at the central part of which axle is secured a rack pinion 108, the wheels 94 being rotatable on said axle, and this rack pinion engaging with a rack 109, as will be further explained later. The other end of the armature shaft of motor 95 is adapted to be coupled in driving relation with a pinion 110 secured to the end of shaft 111 journaled in a bearing 112 mounted on the truck frame. Any suitable manually controlled or other mechanism may be provided for coupling the armature shaft with the pinion 111. As shown, a magnetic clutch member 113 is carried by the shaft, and a companion clutch member 114 is connected to shaft 111, so that upon current flow through the clutch mechanism the two shafts will be tied together. The pinion 110 meshes with gear 115 on shaft 116 mounted in bearings 117, the shaft 116 carrying also a pinion 117' meshing with gear 118 secured to the front axle 91, to which axle the front wheels 93 are secured to rotate therewith. The gearing train between the motor and the rack pinion 108 is designed to greatly reduce the speed of the motor, the rack pinion engaging the rack 109 to propel the tractor slowly and powerfully when the towing cable is connected to a vessel. During towing the magnetic clutch mechanism is de-energized, but when the tractor is to be returned after a towing trip the clutch is energized and the front axle connected with the motor to propel the tractor at increased speed, provision being made to return the tractor on a return track where there is no rack, and during such return trip of the tractor the rack wheel and intervening gearing train will rotate idly. In order to brake the tractor suitable automatically controlled braking means are provided. As shown, the counter shaft 98 at its end carries a brake wheel 119 engaged by a brake strap 120 locked to the truck frame at 121, the ends of the strap connecting in the well known manner with a brake lever 121' at opposite sides of the pivot point 122 of the lever, the lever being pivoted to the side wall 123 of the motor car and being pivoted to a solenoid core 124 surrounded by a winding 125 to be controlled as will hereinafter be further explained.

The motor cars B and B' have precisely the same construction and arrangement, and the middle or winch mechanism supporting section A is supported from and between the motor cars. The tractor is quite long, and in order that it may readily take the various trackage curves and the steep and abrupt inclines between the various locks of a canal, the winch section is pivotally supported, so that the motor cars and winch sections may readily assume vertical and horizontal angles with reference to each other. Mounted on each motor car truck frame over the central part of the rear axle 92 is a pivot block 126 having a spherical head or ball 127. Secured to each end of the winch section frame at the middle thereof is a bracket 128, whose outer end forms the socket 129 for receiving the head or ball 127 on the adjacent motor car. Mounted also on each truck frame over each end of the rear axle is a buffer block 130 whose upper surface is concentric with the axle. Secured to each end wall of the winch frame and at the ends thereof is a buffer bracket 131, whose outer end bears on the adjacent buffer block. The ball and socket pivotal connection between the winch section and the motor cars gives the tractor great flexibility and allows it to readily round curves and to mount abrupt inclines. The engagement of the buffer brackets with the buffer blocks will, however, prevent lateral tilting or tipping of the winch section during towing operation. This arrangement also enables the substitution of another motor car section should any section or its apparatus become broken or played out, all that is necesary being to raise the winch frame to carry the socket bracket away from the pivot ball. The motor car sections can also be run by themselves for other purposes besides towing, and a tractor can be readily connected up by applying a winch frame to two motor car sections. Either one or both of the motor car sections can be effective for propelling the tractor.

At the front end of each motor car section are installed various circuit controlling mechanisms for controlling the electric power supply to the various motors and magnetic mechanisms. As shown, a main controller 132 is provided for controlling the current flow to the rack pinion driving motor 95, and connected with suitable contacts in this controller are the terminals of the solenoid 125 for controlling the propulsion brake mechanism, the arrangement being preferably such that when the switch controlling handle 133 is in off position to disconnect current from the motor 95 the circuit through the solenoid winding 125 will be closed and the rack pinion rigidly locked against rotation, and so that as soon as the lever 133 is moved to admit current flow to the motor the solenoid circuit will be broken and the solenoid released to allow the motor to drive the rack pinion. Other controller mechanism 134 is provided for controlling the current flow to the motor 17 and the magnetic brake controlling mechanism 69, the arrangement being preferably such that when the controller mechanism is in position to shut off current flow to the motor the circuit through the electromagnetic mechanism 69 will be closed and the winch drum 41 locked, and so that when the controller mechanism is moved to admit current flow to the motor the circuit for the electromagnetic mechanism will be opened to allow the motor to operate to rotate the winch drum. A third controller mechanism 135 is provided for simultaneously controlling the operation of motor 63 and of the electromagnetic mechanism 64, 65 and 66, the arrangement being preferably such that when the controller mechanism is in normal position current flow will be shut off from both the motor and the magnetic mechanism, and so that when the controller mechanism is moved to admit current flow to the motor the magnetic mechanism will first be energized to release the cable drum from the heads 39 and 40 to allow the drum to be driven by the motor at increased speed to haul in the cable. The magnetic brake for connecting the motor 95 in driving relation with the rear axle may be controlled by a switch 136 suitably connected in circuit with the electromagnetic mechanism. Thus the various operative parts can be readily controlled by a single operator, and alternate connections are in great part automatically accomplished. The motor cars can of course have accessories, such as draw bars, head lights, gongs, and so on. The motor cars are also preferably roofed over in greater part by a wall 137 and open only at the front to form room 138 for the operator. In the roof a trap door 139 may be provided, so that access may be had to the interior.

The track construction is best shown in Fig. 3. The inner track over which the tractors pass when towing is close to the edge of the wall $w$ of the canal, so that the cable extending from the winch section will clear the edge of the canal wall, particularly when low vessels, such as barges, lighters or scows are being towed. The cable, after leaving the sheave 78, will engage with the outer edges 140 of the winch housing, particularly when low vessels are being towed, but these edges are well rounded and smooth, so that the cable will not in any way be injured. Each track comprises rails 141 set into the concrete of the canal wall, and midway between the rails of the inner track are set the rack frames 142 for supporting the rack sections 109, the frames being set well into the concrete with only the upper ends thereof above the coping level. The head $109^h$ of the rack sections is horizontal, and its ends $109^e$ overhang the legs $109^c$. In the head are formed the openings 143, into which extend the teeth of the rack pinions 108. As shown in Fig. 3 and also in Figs. 1 and 2, each track frame supports vertical bearings 144 and 145 adjacent the rack pinion, these bearing frames journaling shafts 146 and 147 which at their lower end carry thrust wheels 148 and 149, the cylindrical periphery of these thrust wheels engaging with the sides of the head $109^h$ of the rack, the thrust wheels at their lower edge having the tapered flanges 150 for engaging with the correspondingly beveled lower surface of the overhanging ends $109^e$ of the rack head. These thrust wheels will prevent lateral displacement of the tractor and can accomplish this purpose alone where the tractor wheels have flat rims, or can assist the tractor wheels when these wheels are of the usual flange type. The beveled flanges of the thrust wheels coöperating with the head of the rack will also prevent tipping or tilting of the tractor. To assist in preventing tilting or tipping of the tractor, frames 151 may be provided on the truck frames, whose lower ends 152 hook under and engage with the ends $109^e$ of the rack. The tractors are thus at all times confined to the track and prevented from lateral displacement therefrom or from tipping over. Adjacent the track conductor conduit frames 153 are sunk into the concrete and support the upper conductors to be engaged by the collector mechanisms 154 supported from frames 155 extending from the motor car truck frames. The rails, racks and conductor conduits are preferably secured to main supporting members 156 to form unitary structures which are embedded in the concrete. The outer track 156', of which one rail only is shown, does not have the racks along the level stretches, but where the grades are steep, particularly between locks, racks are provided. This track is used when the tractors return after a towing trip, the rack pinions and transmission trains running idly on the return trip, during which the tractors are driven at greater speed by the front wheels and axles coupled to the motor 95 by the magnetic clutch mechanism.

In some canals, where swing gates, such as miter gates are used, the gates are within recesses formed in the side walls. As shown in Fig. 3, a recess 157 accommodates a gate 158, and the inner track runs over the recess. However, to support the track over these recesses cantaliver frames 159 embedded in the concrete wall extend into the recesses and support the track structure frames, so that the operation of the gate will in no wise be interfered with.

Referring now to Fig. 5, the method of arranging tractors for towing and their connection with a vessel is illustrated. Each tow unit involves four tractors T, two front tractors at opposite sides of the canal and connecting by cables $c$ and $c'$ with the starboard and port sides respectively at the prow of the vessel V, and two rear tractors at opposite sides of the canal being connected by cables $b$, $b'$ with the starboard and port sides respectively at the stern of the vessel. The winch mechanisms of the tractors are then operated until the vessel is adjusted in mid-channel, whereupon the front tractors are propelled forwardly to tow the vessel, and the rear tractors are not propelled but are trailed, and by adjusting the cables from these rear tractors the vessel is steered and guided. If it is desired to slow up the vessel the front tractors are slowed down and the rear tractors braked, and if it is desired to stop the vessels all the tractors are gradually braked. Thus the vessel can be entirely towed, maneuvered, and controlled within full sight of the operators on all the tractors and independently of the vessel's own propelling and controlling apparatus. There is therefore no chance for misunderstanding of signals between officers on deck and men below deck, as will be the case where the vessel assisted during the towing operation with its own propelling and controlling apparatus. If it is desired to anchor a vessel adjacent one wall of the canal the cables running from the tractors on said wall are drawn in and the cables for the opposite tractors kept taut.

Vessels passing through canal locks are of course of different heights, so that there will be considerable difference in the angles of the towing cables. For ordinary vessels, of course, the cables will not dip sufficiently to engage the edges of the wall copings. However, where the vessels are low in the water my improved construction and arrangement will prevent contact of the cables with the coping edges, as the tracks are very close to these edges, so that the cables can dip through a large angle without being chafed by the coping edges. As the heavy apparatus of the tractors is set low down, the center of gravity of each tractor is low, and where the dip of the cables is not too great, the weight alone of the tractors would prevent tipping or displacement thereof on the tracks. However, where the cables dip quite low and excess of tension thereon would tend to tip or displace the tractors against their own weight, the flange thrust wheels, together with the hook frames engaging the racks, will efficiently prevent such tipping or displacement. Also, where the vessel is high in the water and the cables deflect upwardly the weight of the tractors will ordinarily be sufficient to counteract the lifting tendency of the cables, and where the inclination upwardly is greater the thrust wheels and hook frames will of course become effective to prevent tipping or displacement. The majority of vessels of the present day will require only one towing unit, that is, four tractors. However, for large and heavy vessels a multiple of units are used. As shown in Fig. 4, the dotted lines show additional units each connected with the vessel by a cable, the adjacent tractors running in tandem either independently or coupled together.

The cables are well protected against excessive strain by slip drum mechanism, this mechanism being set by means of the mechanism already described to prevent slipping of the drum up to a certain maximum tension on the cable and to allow slippage when such maximum tension is exceeded. A sufficient factor in safety is, however, allowed, and the maximum tension value set sufficiently high so that slipping will not occur under ordinary towing conditions, and control of the vessel will not be lost at any time on account of such slippage. The rotatable frames or turrets on the winch sections of the tractors will always revolve to carry the cable sheave to a position normal to the tow line, and the cable passing centrally through the turret will always be accurately wound on the drum or unwound therefrom. As soon as the current is withdrawn from the winch driving motor the winch is braked and the cable held. Also, as soon as the current is withdrawn from the traction motors the motor car units are braked and the tractors brought to a stop. The auxiliary higher speed winch driving mechanism allows the cables to be quickly hauled in after a towing period, and the auxiliary higher speed propelling mechanism allows the tractors to be quickly returned to the starting point after a towing trip. All the various operating parts can be controlled electrically by a single operator on each truck. Other advantages of my system are also apparent from the above description thereof.

I do not desire to be limited to the precise construction, arrangement and operation which I have described, as changes and modifications are of course possible, which would still come within the scope of my invention, and I therefore desire to secure the following claims by Letters Patent:

1. In a traveling winch, the combination of a housing, a winch within said housing, a motor within said housing for driving said winch, a guide frame pivoted to the roof of said housing to rotate about a vertical axis and having an opening through which cable may extend from the winch to the exterior, and a guide sheave journaled in said rotatable guide frame in position to accurately guide the cable to and from the winch during any position of said guide frame.

2. In a traveling winch, the combination of a supporting frame, a winch supported on said frame, a motor mounted on said frame for driving said winch, a guide frame pivoted over said winch to rotate about a vertical axis and having an opening through which cable may extend from said winch to the exterior to be connected with a vessel to be towed, and a guide sheave journaled to said guide frame with its horizontal inner section coincident with the axis of the opening through said guide frame whereby the section of cable between said winch and sheave will maintain a substantially permanent alinement and direction with reference to the winch.

3. In a traveling winch, the combination of a supporting frame, means for propelling said supporting frame, a winch mounted on said supporting frame, means for guiding cable from said winch to the exterior for connection with a vessel to be towed, a main driving motor for said winch, a transmission train for connecting said motor with said winch to cause slow and powerful operation thereof when the cable is connected with the vessel to be towed, and an auxiliary motor adapted for connection with said winch to cause increased speed thereof for hauling in the cable after disconnection thereof from the vessel.

4. In a traveling winch, the combination of a supporting frame, means for propelling said supporting frame, a winch mounted on said supporting frame, means for guiding cable from said winch to the exterior for connection with a vessel to be towed, a main driving motor for said winch, a transmission train for connecting said motor with said winch to cause slow and powerful operation thereof when the cable is connected with the vessel to be towed, an auxiliary motor adapted for connection with said winch to cause increased speed thereof for hauling in the cable after disconnection thereof from the vessel, and means for automatically disconnecting the main motor from driving relation with said winch when said auxiliary motor is connected in driving relation with the winch.

5. In a traveling winch, the combination of a supporting frame, means for propelling said frame, a winch mounted on said frame, means for guiding cable to and from said winch, a main electric driving motor on said frame adapted for driving said winch slowly and powerfully, an auxiliary electric driving motor adapted for driving said winch at increased speed, and coupling mechanism adapted for automatically effecting disconnection of the main driving motor from the winch when driving current is supplied to the auxiliary motor.

6. In a traveling winch, the combination of a supporting frame, a winch on said frame, a main electric driving motor on said supporting frame adapted for driving said winch slowly and powerfully, means normally connecting said motor in driving relation with said winch, an auxiliary electric motor for driving said winch at increased speed, and means controlled upon current supply to said auxiliary motor for automatically disconnecting said main motor from driving relation with said winch.

7. In a tractor for towing vessels, the combination of a winch drum, driving heads adjacent the sides of said winch drum, friction disks between said winch drum and said driving heads, a driving motor, transmission mechanism interposed between said driving motor and driving heads, and means for adjusting said heads toward or away from each other to adjust the frictional engagement between said heads and said drum.

8. In combination, a winch drum, a driving motor connected with said drum to drive said drum slowly and powerfully, friction clutch mechanism interposed in said connection between said motor and drum to allow independent rotation of said drum when the coupling force of the friction clutch mechanism is overcome, and an auxiliary motor having direct connection with said drum to drive said drum at increased speed.

9. In combination, a winch drum, a driving motor connected with said drum to drive said drum slowly and powerfully, friction clutch mechanism interposed in said connection between said motor and drum to allow independent rotation of said drum when the coupling force of the friction clutch mechanism is overcome, an auxiliary motor having direct connection with said drum to drive said drum at increased speed, and means automatically controlled to disconnect the friction clutch mechanism when said auxiliary motor is started to directly drive said drum.

10. In winch mechanism, the combination of a supporting frame, a winch drum mounted in said frame, and a turret pivoted on said frame over said drum to rotate about a vertical axis, said turret having an opening extending therethrough for receiving a cable extending from the drum, the inner end of said opening being at the axis of said turret and in the cable receiving plane of said drum whereby said cable will always be accurately guided from and toward said drum upon rotation of the drum.

11. In a winch, the combination of a drum, a driving source having direct connection with said drum for causing rapid rotation thereof, a second driving source for said drum, and friction clutch mechanism interposed between said second driving source and said drum, said second driving source serving to rotate said drum slowly and powerfully.

12. In a winch, a drum and two independent driving sources for said drum, one of said sources being directly connected with said drum to cause rapid operation thereof and said other source being connected with said drum to cause more slow and powerful operation thereof.

13. In a winch, a drum and two independent driving sources for said drum, one of said sources being directly connected with said drum to cause rapid operation thereof and said other source being connected with said drum to cause more slow and powerful operation thereof, means for automatically connecting one of said sources in driving relation with said drum, and means for automatically disconnecting one of said driving sources from driving relation with said drum upon driving association of said other source with said drum.

14. In a towing system for canals, the combination of tracks placed on opposite sides of the canal and following the general direction of the canal, tractor units running on said tracks at opposite sides of the canal in advance of the vessel to be towed and independently connected by cable with the front end of said vessel, tractor units running on said tracks at opposite sides of the canal to the rear of said vessel and each connected by a cable with the rear end of said vessel, winch mechanism on each tractor for controlling the intake or output of the cable, and reversible propulsion mechanism for each tractor, said tractors being confined to said tracks and controlling the movement and steerage of the vessel entirely independently of any driving or steering mechanism on the vessel.

15. In a towing system for canals, the combination of tracks placed on opposite sides of the canal and following the general direction of the canal, tractor units running on said tracks at opposite sides of the canal in advance of the vessel to be towed and independently connected by cable with the front end of said vessel, tractor units running on said tracks at opposite sides of the canal to the rear of said vessel and each connected by a cable with the rear end of said vessel, and propulsion mechanism for each tractor, said tractors being confined to said tracks and controlling the movement and steerage of the vessel entirely independently of any driving or steering mechanism on the vessel.

In witness whereof, I hereunto subscribe my name this 17th day of November, A. D., 1910.

EDWARD SCHILDHAUER.

Witnesses:
WALTER W. HERRINGTON,
GEO. A. YINGLING.

Copies of this patent may be obtained for five cents each, by addressing the "Commissioner of Patents, Washington, D. C."